3,170,590
PAIL TYPE SHIPPING CONTAINER
Frederick E. Ullman, Winnetka, Phillip C. Urasky, Chicago, and James J. Deegan, Downers Grove, Ill., assignors, by mesne assignments, to Inland Steel Company, Chicago, Ill., a corporation of Delaware
Filed Aug. 10, 1962, Ser. No. 216,094
1 Claim. (Cl. 220—91)

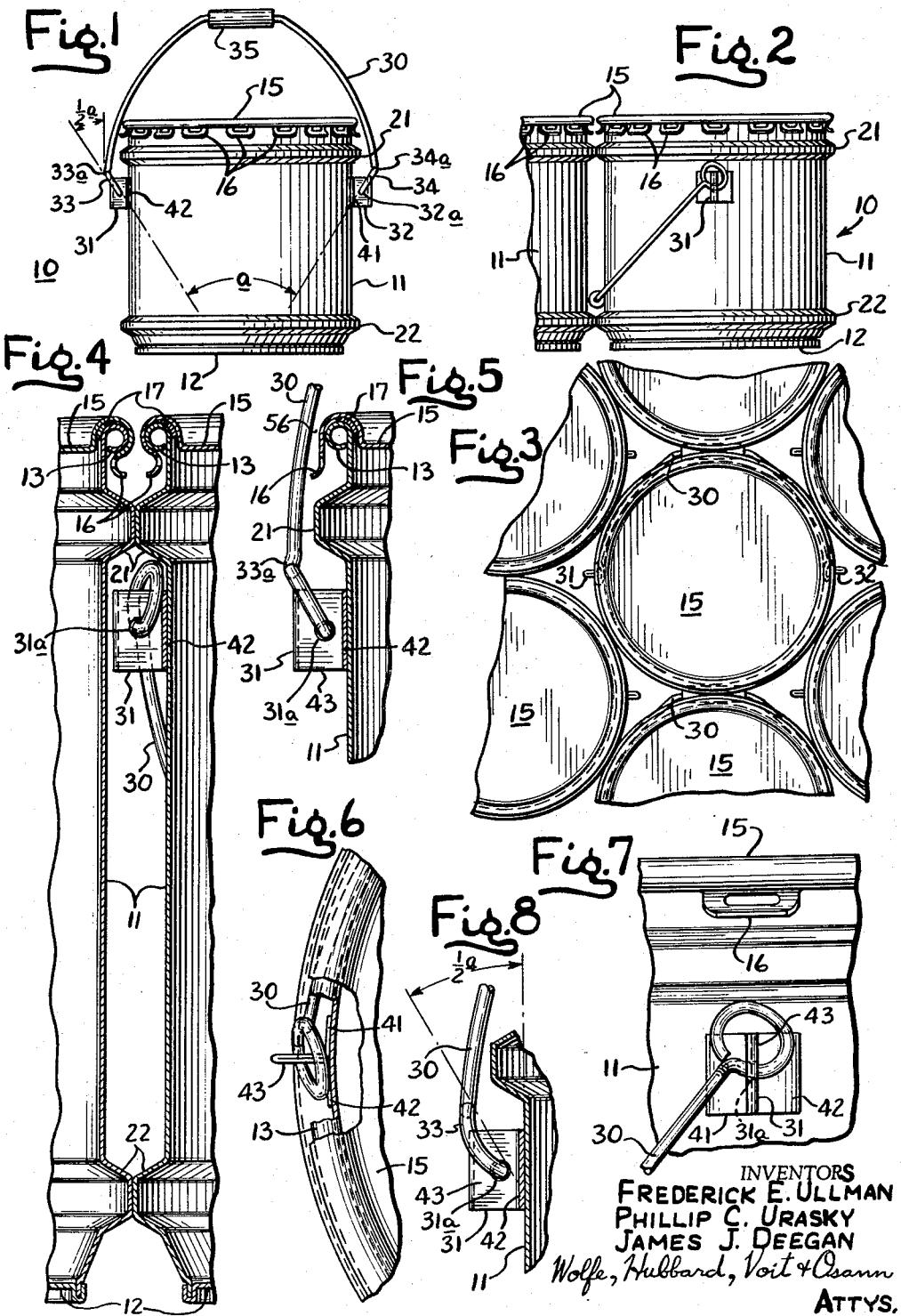

The present invention relates to a container and more particularly to an improved angled bail construction therefor.

In the steel shipping container industry a common type of shipping container is known as an "open head" container or pail and conventionally provided with a bail diametrically pivoted on ears welded or otherwise affixed to the sides of the container. Such containers, in two to seven gallon sizes, are conventionally reinforced by deforming the wall into one or more ridges or beads and are provided with covers which are crimped to a curl formed along the upper edge.

It is desirable, in order to avoid waste space, and to prevent damage during transit, for the containers to be placed bead-to-bead. However, this condition is difficult to achieve, since, in a conventional ear and bail design, the bails, when in lowered position, extend substantially beyond the profile of the container and interfere with adjacent containers.

Accordingly it is an object of the present invention to provide a container having an improved bail construction in which the loops of the bail are angled inwardly so that the bail may be swung to its upraised position without interference with the bead or curl, uncrimped or crimped-on cover but which nevertheless causes the bail to occupy a closely nested position about the container when the bail is swung downwardly, thereby permitting similar containers to be nested compactly together bead-to-bead without interference from the bail. It is a related object to provide a container having an improved bail and ear construction which avoids any possibility of the bail of one container rubbing against the side wall of the adjacent container during shipment or handling thereby to deface paint, decoration, or labelling on the outside of the adjacent container. It is still another object to provide an improved bail and ear construction in which little or no care need be exercised during handling or packing, and in which it is not necessary to orient one container carefully with respect to the adjacent ones.

Finally, it is an object of the invention to provide a novel bail and ear construction which is inexpensive and which may be manufactured at a cost which is no higher than that of bails not having the cover and bead-clearing feature. It is a more specific object to provide a bail having loops at the ends for engaging the ears of a pail in which the ends of the bail are cammed inwardly as the bail is swung downwardly to a nested position.

Other objects and advantages of the invention will become apparent upon reading the attached detailed description and upon reference to the drawing in which:

FIGURE 1 is a side view of a container having ear and bail constructed in accordance with the present invention and with the bail shown in upraised position.

FIG. 2 is a side view taken at right angles to FIG. 1 and showing the bail in lowered position.

FIG. 3 is a top view showing a plurality of containers side by side.

FIG. 4 is a fragmentary section showing the contact between adjacent containers with the bail in lowered position.

FIG. 5 is a fragmentary section showing the "clearing" of the cover as the bail is upraised.

FIG. 6 is a fragmentary top view showing the projection of the ear beyond the container profile.

FIG. 7 is a fragment showing the relation between the bail loop and ear when the bail is in lowered position.

FIG. 8 is a fragment showing the profile of an alternate loop embodiment.

While the invention has been described in connection with a preferred embodiment, it will be understood that we do not intend to be limited to the illustrated embodiment but intend to cover the various alternative and equivalent constructions included within the spirit and scope of the appended claims.

Turning now to the drawing, a typical shipping container or pail 10 of the type under construction has a cylindrical side wall 11 and bottom wall 12. At the upper edge or lip of the container is an outwardly projecting curl 13 (see also FIG. 5) which serves as a seat for a crimp type cover 15. The latter is formed with a plurality of lugs 16 which are seated around the curl by a suitable crimping machine well known to those skilled in the art. Where hermetic sealing is required, a ribbon of sealing compound 17 or a suitable gasket may be provided inside the edge of the cover. To open the cover the lugs 16 are simply pried outwardly by a suitable prying tool inserted in slots which are formed in the lugs.

For the purpose of reinforcing the side wall, particularly against crushing or deformation during shipment, and to enable use of thinner gauge metal than would otherwise be possible, an upper bead 21 is formed adjacent the upper end of the container and an optional second bead 22 is formed adjacent the base. These beads are preferably of the same radial height. Preferably also the height of the bead exceeds that of the curl by an amount which is substantially equal to or slightly greater than the thickness of the cover metal so that the containers may seat cover-to-cover as well as bead-to-bead for protection during shipment. For convenient carrying and handling of the container, a curved bail 30 is provided which engages ears 31, 32 secured to the side wall of the container, circular loops 33, 34 being formed on the ends of the bail. At the center of the bail is a handle 35 which may be made of wood or plastic. The bail 30 is suitably curved throughout its entire length except for the central "flat" which mounts the handle 35 and is of such height that bending stresses resulting from carrying a loaded pail do not cause substantial inward deformation of the bail.

Turning attention to the ear 31, it is preferably formed of a flat strip of metal bent to provide flanges or anchoring pads 41, 42 flanking a flat central portion 43 which is vertically oriented and which extends radially outward from the wall of the container. The flanges 41, 42 are secured to the walls of the container by spot welding or the like directly below the upper bead.

In accordance with the present invention the circular loops 33, 34 at the ends of the bail are bent inwardly from the normal straight up-and-down position so that the lower portions of the loops lie in intersecting planes at an angle "$a$" which lies within the range of about 45° to about 100° and which is preferably 60°. Where planar loops are used, the bends are made sharply, right at the junction with the loop, i.e., at the points 33a, 34a shown in the drawing. Using a loop having a mean diameter on the order of ¾ inch this results in a differential spacing between the upper and lower portions, respectively, of the loops on the order of ⅜ inch. Moreover, in carrying out the present invention the openings in the ears 31, 32, and which are indicated at 31a, 32a, are preferably such as to provide a relatively snug sliding engagement between the loops and the ears. This brings about a well defined camming engagement between the ears and the loops as the bail is swung from its upraised position into its lowered position, regardless of whether the bail happens to be sprung slightly inward or slightly outward. Inward springing is, however, prefered since it assists in the inward camming of the bail ends and is, moreover, readily overcome by the weight of the pail and contents as the bail is swung upwardly into its active carrying position.

During normal use with the bail in vertical position, the pail is suspended at the lower portion of the two bail loops and, because of the angling of the loops, the bail is spread outwardly thus clearing the cover of the bail. As indicated at 56 (FIG. 5), the angling may be such that clearance is adequate to insure clearance of the lugs 16 regardless of whether they are in their crimped or uncrimped positions. Prior to crimping, and when the pail is shipped from the manufacturer to the user or filler, the lugs occupy a straight vertical position. When the lugs have been crimped and subsequently uncrimped by a prying tool, the tips of the lugs will normally occupy a position which is at a slightly greater radius than that shown in FIG. 5. In either event the clearance is adequate to permit the cover to be temporarily replaced while still permitting subsequent use of the bail. This feature is particularly desirable where material may be removed from the container a little at a time, as in the case of paint, and where the cover is replaced to provide protection in the interim.

When the bail is swung downwardly from the position shown in FIG. 1 to the position shown in FIG. 2, the loops at the ends of the bails bodily rotate with respect to the ears which they engage. It will be apparent upon inspection of the drawing that such bodily movement because of the angling is accompanied by inward camming of the loops which draws the ends of the bail radially inward into a compact nested position. Thus, at the beginnig of the downward swing the ears engage the lower portions of the loops whereas when the bail occupies the fully lowered position the ears engage the upper portions of the loops which are more widely spaced. Where the bail is inwardly sprung, swinging of the bail from the upraised position to the lowered position the angling of the loop permits, rather than forces, the ends of the bail to come together.

The practical advantage of the construction will become apparent upon considering a typical cycle of use. After a container has been fabricated, and a label applied in the form of a printed or silk screened impression, decal or the like, the containers must be stored as compactly as possible until use. In the present construction, since the bail 30 is uniformly curved and occupies a closely nested position against the cylindrical wall of the container, the containers may be packed bead-to-bead with no contact between the bail of one of the containers and the side wall of another. Moreover, since the bail is in a completely out-of-the-way position, the containers may be nested together as in FIG. 3 with geometric precision. The ears and handle do not interfere since they have a radial projection which is less than the available clearance provided by the abutting beads. After the containers are filled and after the lids 15 have been crimped in place, temporary storage or warehousing is again necessary prior to shipment and, again, the nested bails facilitate packing.

In lifting a container of the above type it is desirable to utilize the bail and handle since a filled container has substantial weight, of the order of sixty-five pounds or more, depending upon the material which it contains. When the handle is pulled upwardly, the upward component of force thereon causes the ears to tend to "bottom" in the lower portions of the loops so that the loops, by reason of the relative movement, are cammed outwardly into the "clearing" position shown in FIG. 1.

Since the handle and the ears together occupy such a small portion of the total periphery, no difficulty will be found in stacking pails adjacent one another and no particular caution need be taken to avoid bail-to-bail contact. The construction therefore brings about a high degree of economy, not only because of the reduction in volume of storage required but also because of the reduction in handling labor and the saving of handling time. Moreover, since the bails are prevented from scratching or denting the painted or labeled surfaces of adjacent containers, each of the containers is more likely to remain in perfect condition until it reaches the hands of the customer. Rail shipping damage is minimized with bead-to-bead packing since each container presents its reinforced beads to the adjacent container to take up impact.

If desired, without departing from the invention, the loops, instead of being bent sharply (as at 33a, 34a) may be formed with the loop itself curved as shown in profile in FIG. 8 and so that the angle of the chord, indicated as "½a" corresponds to the angle of the bend in the earlier embodiment. Consequently the term "angled" used in the claims shall be understood to apply to both versions.

It may be pointed out that the present bail and ear construction is not dependent upon the condition of spring of the bail, i.e., whether the bail is sprung inwardly or outwardly. However, it is prefererd that the bail be substantially neutral or that it have a slight inward spring. Substantial outward spring should be avoided because of a possible tendency for the bail to "stand out" from the side of the pail.

While there are a number of advantages in employing the present construction, it is to be specially noted that these advantages have been brought about simply as a result of the shape or configuration of the bail without adding any parts or element of additional expense except that of the bending operation.

We claim as our invention:

In a shipping container the combination comprising a cylindrical wall, the upper edge of said wall being formed into an outwardly extending curl, a bead formed in said wall adjacent to and beneath said curl, a cover seated on said upper edge projecting outwardly beyond said cylindrical wall, a pair of ears secured to said wall beneath said bead in diametrically opposite positions, said ears being in the form of flat vertically oriented pieces of metal extending radially outward from said wall and having a radial extent slightly less than twice the height of said bead so as to permit accommodation of said ear when similar containers are stacked bead to bead, a bail having an arcuate profile and generally circular loops formed at its ends, said loops being angled inwardly with respect to said profile and occupying planes bearing an angle of about 45° to about 100°, and said ears having openings for relatively snug sliding engagement with said loops so that when said bail is swung downwardly said loops slide in said openings causing the ends of the bail to be cammed radially inward for snug nested engagement between the bail and the wall of the container.

References Cited in the file of this patent
UNITED STATES PATENTS

| 32,397 | Drummond | May 21, 1861 |
| 485,011 | Kneeland | Oct. 25, 1892 |
| 1,029,029 | Ritchell | June 11, 1912 |
| 1,063,609 | Shaw et al. | June 3, 1913 |
| 1,474,645 | Schilling | Nov. 20, 1923 |
| 1,527,897 | Mittinger | Feb. 24, 1925 |
| 1,910,426 | Courtright | May 23, 1933 |
| 1,948,920 | Johnson | Feb. 27, 1934 |
| 2,233,843 | McClaskey | Mar. 4, 1941 |

THERON E. CONDON, *Primary Examiner.*
EARLE J. DRUMMOND, *Examiner.*